United States Patent
Gebreselassie et al.

(10) Patent No.: US 6,736,442 B2
(45) Date of Patent: May 18, 2004

(54) FLOOR COVERINGS FOR VEHICLES HAVING INTEGRATED AIR AND LIGHTING DISTRIBUTION

(75) Inventors: Girma Gebreselassie, Southfield, MI (US); Surendra Khambete, West Bloomfield, MI (US)

(73) Assignee: Collins & Aikman Products & Co., Troy, MI (US)

( * ) Notice: Subject to any disclaimer, the term of this patent is extended or adjusted under 35 U.S.C. 154(b) by 46 days.

(21) Appl. No.: 10/118,674

(22) Filed: Apr. 9, 2002

(65) Prior Publication Data

US 2003/0102690 A1 Jun. 5, 2003

Related U.S. Application Data (60) Provisional application No. 60/334,483, filed on Nov. 30, 2001.

(51) Int. Cl.[7] ............................................... B62D 25/20
(52) U.S. Cl. ...................... 296/97.23; 296/208; 165/42; 362/488
(58) Field of Search ...................... 296/187.08, 193.07, 296/208, 97.23; 165/41, 42; 362/480, 471, 483, 488

(56) References Cited

U.S. PATENT DOCUMENTS

| | | | |
|---|---|---|---|
| 3,078,116 A | * | 2/1963 | West ........................... 296/208 |
| 3,277,811 A | * | 10/1966 | Fischer ........................ 454/144 |
| 3,366,026 A | * | 1/1968 | Herr et al. ................... 454/137 |
| 3,494,657 A | * | 2/1970 | Tantlinger et al. ........... 296/208 |
| 3,902,900 A | * | 9/1975 | Smith ..................... 237/12.3 A |
| 4,044,221 A | | 8/1977 | Kuhn ........................... 219/217 |
| 4,231,901 A | * | 11/1980 | Berbeco ....................... 362/556 |
| 4,330,703 A | | 5/1982 | Horsma et al. .............. 219/553 |
| 4,394,714 A | * | 7/1983 | Rote ............................ 362/576 |
| 4,512,239 A | | 4/1985 | Watanabe et al. ............ 98/2.03 |
| 4,519,017 A | * | 5/1985 | Daniel ......................... 362/565 |
| 4,529,639 A | | 7/1985 | Peoples, Jr. et al. .......... 428/95 |
| 4,861,095 A | | 8/1989 | Zajic .......................... 296/182 |
| 4,870,895 A | | 10/1989 | Mayer .............................. 98/2 |
| 4,884,865 A | * | 12/1989 | Grise .......................... 385/115 |
| 4,898,419 A | * | 2/1990 | Kenmochi et al. .......... 296/204 |
| 4,927,209 A | | 5/1990 | Maruyama ................... 297/180 |
| 5,052,283 A | * | 10/1991 | Altus .......................... 454/144 |
| 5,149,186 A | | 9/1992 | Matsuno et al. ............... 362/75 |
| 5,254,384 A | | 10/1993 | Gordon ......................... 428/71 |
| 5,280,852 A | | 1/1994 | Dauvergne .................. 237/12.3 |
| 5,354,114 A | * | 10/1994 | Kelman et al. ............. 296/192 |
| 5,441,326 A | | 8/1995 | Mikalonis ................... 296/208 |
| 5,449,321 A | | 9/1995 | Dauvergne .................. 454/139 |
| 5,452,186 A | | 9/1995 | Dassanayake ................ 362/80 |
| 5,524,923 A | * | 6/1996 | Henseler ................... 280/728.3 |
| 5,554,830 A | | 9/1996 | Muller et al. ............... 181/290 |
| 5,573,327 A | | 11/1996 | Dealey, Jr. et al. ........... 362/80 |
| 5,605,642 A | | 2/1997 | Nece ........................... 219/202 |
| 5,647,657 A | | 7/1997 | Damasky et al. ............. 362/32 |

(List continued on next page.)

FOREIGN PATENT DOCUMENTS

| | | |
|---|---|---|
| EP | 0 675 319 | 10/1995 |
| WO | WO 01/63172 | 8/2001 |

*Primary Examiner*—D. Glenn Dayoan
*Assistant Examiner*—Patricia L. Engle
(74) *Attorney, Agent, or Firm*—Myers Bigel Sibley & Sajovec (57) ABSTRACT

Vehicle floor coverings are provided with tubular air ducts therewithin that are configured to deliver air from air sources upwardly through a porous structure of the floor covering and into a vehicle compartment. Vehicle floor coverings are provided with electrical wiring harnesses therewithin that can facilitate the interconnection of various vehicle electronic components. Vehicle floor coverings are provided with optical fibers therewithin that are configured to deliver light from a light source to one or more locations within a vehicle and/or to provide special effects and customization of vehicle interiors.

60 Claims, 5 Drawing Sheets

U.S. PATENT DOCUMENTS

| | | | | |
|---|---|---|---|---|
| 5,647,658 A | * | 7/1997 | Ziadi | 362/471 |
| 5,715,140 A | * | 2/1998 | Sinkunas et al. | 361/690 |
| 5,766,722 A | | 6/1998 | Morimoto | 428/88 |
| 5,851,626 A | | 12/1998 | McCorry et al. | 428/95 |
| 5,944,416 A | * | 8/1999 | Marsh | 362/568 |
| 6,089,588 A | | 7/2000 | Lesesky et al. | 280/422 |
| 6,092,915 A | | 7/2000 | Rensch | 362/471 |
| 6,116,751 A | * | 9/2000 | Remp | 362/153 |
| 6,120,090 A | | 9/2000 | Van Ert et al. | 296/211 |
| 6,152,588 A | | 11/2000 | Scifres | 362/496 |
| 6,160,475 A | | 12/2000 | Hornung et al. | 340/461 |
| 6,179,453 B1 | | 1/2001 | McMahon | 362/490 |
| 6,231,206 B1 | * | 5/2001 | Hervey et al. | 362/153 |
| 6,282,911 B1 | | 9/2001 | Watanabe et al. | 62/244 |
| 6,318,796 B1 | * | 11/2001 | Felsen | 296/208 |
| 6,383,599 B1 | * | 5/2002 | Bell et al. | 428/95 |
| 6,481,877 B1 | | 11/2002 | Bello, Jr. | 362/488 |
| 6,537,641 B1 | * | 3/2003 | Kroll | 428/95 |
| 6,547,301 B1 | * | 4/2003 | Keller | 296/39.3 |
| 6,597,834 B1 | * | 7/2003 | Hata | 385/31 |

* cited by examiner

FLOOR COVERINGS FOR VEHICLES HAVING INTEGRATED AIR AND LIGHTING DISTRIBUTION

RELATED APPLICATIONS

This application claims the benefit of U.S. Provisional Application No. 60/334,483, filed Nov. 30, 2001, the disclosure of which is incorporated herein by reference in its entirety as if set forth fully herein.

FIELD OF THE INVENTION

The present invention relates generally to vehicles and, more particularly, to floor coverings for use within vehicles.

BACKGROUND OF THE INVENTION

Conventionally, the distribution of air (e.g., outside air, heated air, and/or cooled air) within passenger compartments of vehicles, such as automobiles, is accomplished via air vents in the instrument panel and/or dashboard. Although typically adequate for passengers sitting in the front seat area of a vehicle compartment, the flow of air to other areas of a vehicle compartment (e.g., rear seating areas) may be inadequate and/or may be non-uniform. For example, in sport/utility and mini-van vehicles, generally there are two or more rows of seating. In order to improve the distribution of air within a vehicle compartment, particularly to rear seating areas, it is known to provide air ducts under the upper surface of the floor of a vehicle and which extend to the rear seating areas. In addition it is known to provide air ducts between the roof panel and headliner of a vehicle which extend to rear seating areas.

Although effective for improving the distribution of air within vehicle compartments, these conventional air ducts are disadvantageous because they increase the complexity and cost of vehicle design and manufacturing. Moreover, space within passenger compartments of vehicles may be reduced in order to accommodate the addition of such air ducts.

Lighting within a vehicle compartment is conventionally accomplished via one or more light fixtures mounted to the ceiling and/or doors of a vehicle compartment. Unfortunately, illumination within vehicle compartments produced by conventional vehicle lighting systems may not be adequately transmitted to all areas of a vehicle compartment. For example, the floor areas of a vehicle compartment may not be adequately illuminated. As such, vehicle occupants may have difficulty viewing objects on the floor of a vehicle. Moreover, the addition of lighting in different areas of a vehicle compartment can increase the cost and complexity of vehicle manufacturing, which is generally undesirable.

SUMMARY OF THE INVENTION

In view of the above discussion, vehicle floor coverings are provided with tubular air ducts therewithin that are configured to deliver air from air sources upwardly through a porous structure of the floor covering and into a vehicle compartment. According to embodiments of the present invention, a floor covering for use within a vehicle includes a surface layer having a plurality of apertures formed therethrough, a base layer secured to the surface layer in face-to-face contacting relationship, and one or more tubular air ducts sandwiched between the surface layer and base layer. Each tubular air duct includes a respective plurality of air outlets (e.g., perforations) that are in fluid communication with the apertures in the surface layer such that air flowing through each air duct from an air source is distributed through apertures in the surface layer and into the vehicle. The air outlets can have virtually any configuration, shape, and/or size. Moreover, air ducts may have various numbers of outlets.

According to embodiments of the present invention, a floor covering includes a plurality of apertures in an upper surface portion thereof. One or more air ducts having a plurality of air outlets are disposed within the material. Each of the tubular air ducts includes a respective plurality of air outlets that are in fluid communication with apertures in the upper surface portion such that air flowing through each air duct from an air source is distributed through apertures in the surface and into a vehicle compartment.

Floor coverings according to embodiments of the present invention, include electrical wiring harnesses disposed within floor covering material to facilitate the interconnection of vehicle electronic components. Floor coverings according to embodiments of the present invention, include one or more optical fibers disposed within floor covering material to deliver light from a light source to one or more locations within a vehicle and/or to provide special effects and customization of vehicle interiors. According to embodiments of the present invention, one or more optical fibers configured to deliver light from a light source to one or more vehicle locations may extend within one or more air ducts disposed between a surface layer and a base layer of a vehicle floor covering.

The utilization of air ducts within floor coverings in accordance with embodiments of the present invention can provide better flow and distribution of air (both heated air and cooled air) within vehicles than conventional vehicle air systems. Moreover, embodiments of the present invention can eliminate the need for additional and costly air ducts and equipment that are provided beneath conventional vehicle floor coverings and above vehicle headliners.

In addition, embodiments of the present invention can expedite even distribution of heat within a vehicle. Moreover, because heated air travels through a floor covering, heat may be provided faster to areas within a vehicle that are distant from a heat source.

In addition, embodiments of the present invention can eliminate the need for one or more air outlets within a vehicle instrument panel. Elimination of air outlets in a vehicle instrument panel can result in cost and labor savings during vehicle manufacturing.

Embodiments of the present invention can also enhance acoustical absorption. The perforated configuration of air ducts disposed within a floor covering can be effective in absorbing sound.

The utilization of optical fibers within floor coverings in accordance with embodiments of the present invention can allow the floor area of a vehicle to be better illuminated than via conventional vehicle lighting systems. Moreover, optical fibers can be routed to areas that are difficult to illuminate via conventional lighting systems, such as under seats, beneath dashboards, in trunk compartment areas, etc. Accordingly, embodiments of the present invention can increase lighting effectiveness and can enhance vehicle occupant safety.

The utilization of floor lighting in accordance with embodiments of the present invention can be advantageous compared with conventional vehicle interior lighting. For example, floor lighting according to the present invention does not produce distracting glare to the driver of a vehicle, or to drivers of other vehicles. In contrast, conventional vehicle interior lighting wherein a light is attached to the headliner can cause glare and can distract the driver of the vehicle as well as other drivers. In addition, vehicle safety can be enhanced by floor lighting in accordance with embodiments of the present invention. Floor lighting according embodiments of the present invention can illuminate the interior of a vehicle better than conventional vehicle interior lighting. Accordingly, the present invention can help vehicle drivers and passengers determine that a vehicle is safe to enter. In addition, the utilization of interior lighting in accordance with embodiments of the present invention can enhance the aesthetics of vehicle interiors by making them more visible, in daytime and at nighttime.

In addition, warning light signals can be provided to various locations of a vehicle interior and/or exterior via optical fibers disposed within floor coverings. Moreover, special lighting effects within vehicle interiors can be achieved via embodiments of the present invention. For example, optical fibers can deliver light having one or more colors and/or having special effects to one or more vehicle locations. Customized lighting enhancements and highlighting within vehicle interiors is thereby facilitated by embodiments of the present invention.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Figures 1, 2:
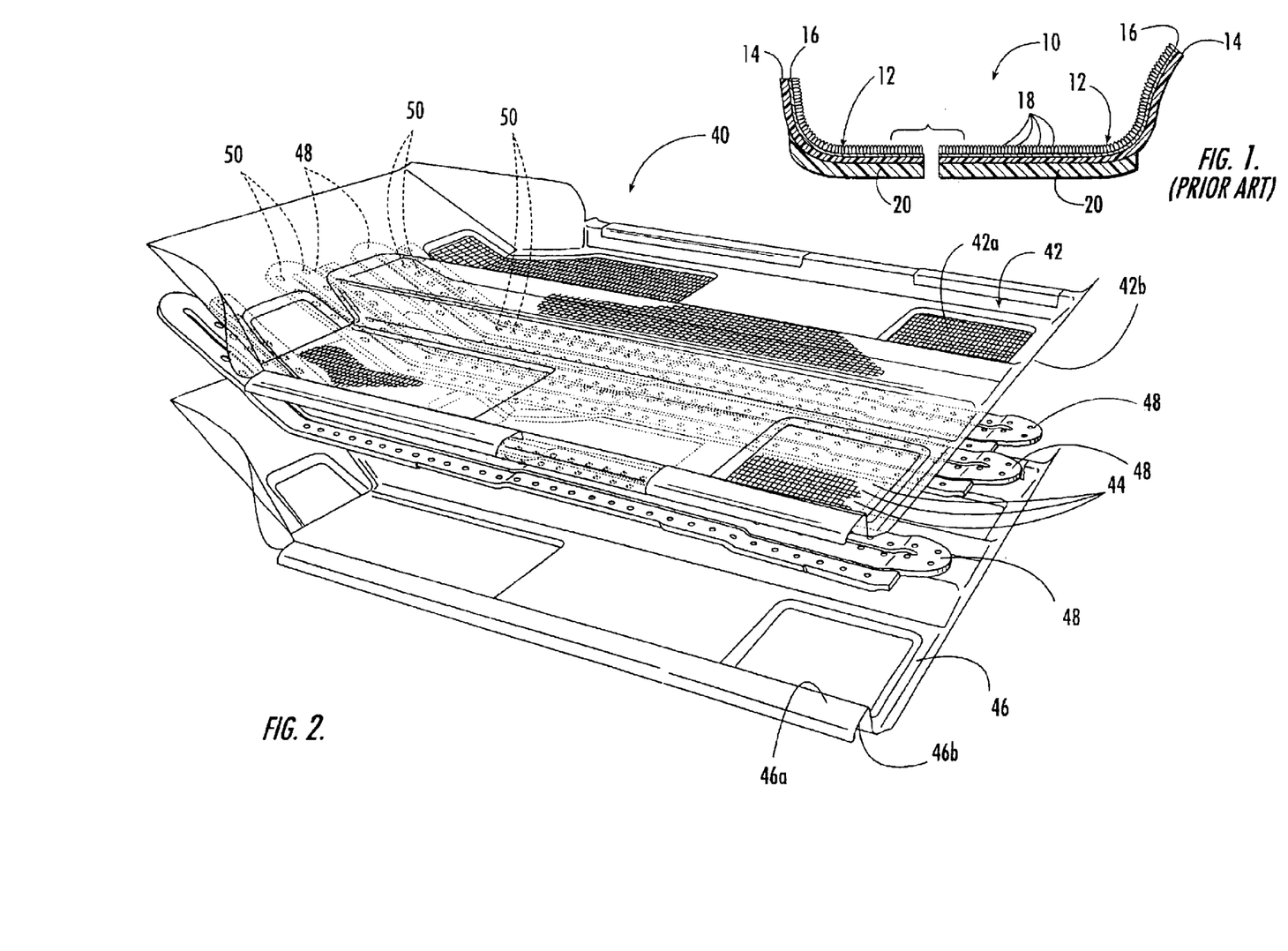
FIG. 1 is a section view of a conventional vehicle carpet having a non-planar, three-dimensional configuration.
FIG. 2 is an exploded perspective view of a vehicle floor covering according to embodiments of the present invention, wherein a plurality of tubular air ducts are sandwiched between a surface layer and a base layer of the vehicle floor covering.

Generally, vehicle manufacturers provide some type of floor covering in the passenger compartment of a vehicle to increase the comfort of occupants, and to provide a resilient and decorative wearing surface with insulating and/or sound attenuating characteristics. For example, the use of carpet as a vehicle floor covering is well known. Conventional carpet for use within vehicles may be of tufted, woven, knitted, or non-woven construction in accordance with known methods of carpet manufacture. As illustrated in FIG. 1, a conventional vehicle carpet 10 includes a surface layer 12 and a base layer 14 adhesively attached thereto in face-to-face relationship. The surface layer 12 includes a backing 16 and pile yarns 18 secured to the backing 16 and extending therefrom to form a pile surface on the front (i.e., vehicle compartment side) of the carpet 10.

A conventional carpet backing is typically of a woven or non-woven construction, depending upon the particular type of carpet construction. Pile yarns may be of any suitable composition, typically polyester or nylon. In order to more securely adhere and lock the pile yarns into a backing, a carpet may include a suitable binder coating, as is conventional in the manufacture of carpets.

Vehicle carpeting is conventionally molded into a non-planar, three-dimensional configuration that conforms to the contours of a vehicle floor. In order to make vehicle carpeting moldable and shape sustaining, it is conventionally provided with a base layer of thermoplastic polymer composition. A base layer may contain fillers to improve sound attenuating properties of the carpet assembly.

Additionally, as illustrated in FIG. 1, vehicle carpets may be provided with padding 20 attached to portions of a base layer for additional cushioning, sound attenuation, and thermal insulation. Padding is commonly formed from relatively inexpensive fibers such as jute or recycled waste fibers, and they are conventionally precut into predetermined desired shapes and bonded to the base layer of a molded carpet.

Non-carpet floor coverings are utilized in various vehicles, such as sport utility vehicles (SUVs). These floor coverings are typically molded thermoplastic polymer compositions. As used herein, the term "floor covering" is intended to include carpet floor coverings as well as non-carpet floor coverings, such as molded thermoplastic polymer compositions (e.g., TUFLOR™ brand floor coverings, available from Collins & Aikman Product Co.). The term "floor covering" is also intended to include carpet/non-carpet combinations.

Figures 3, 4:
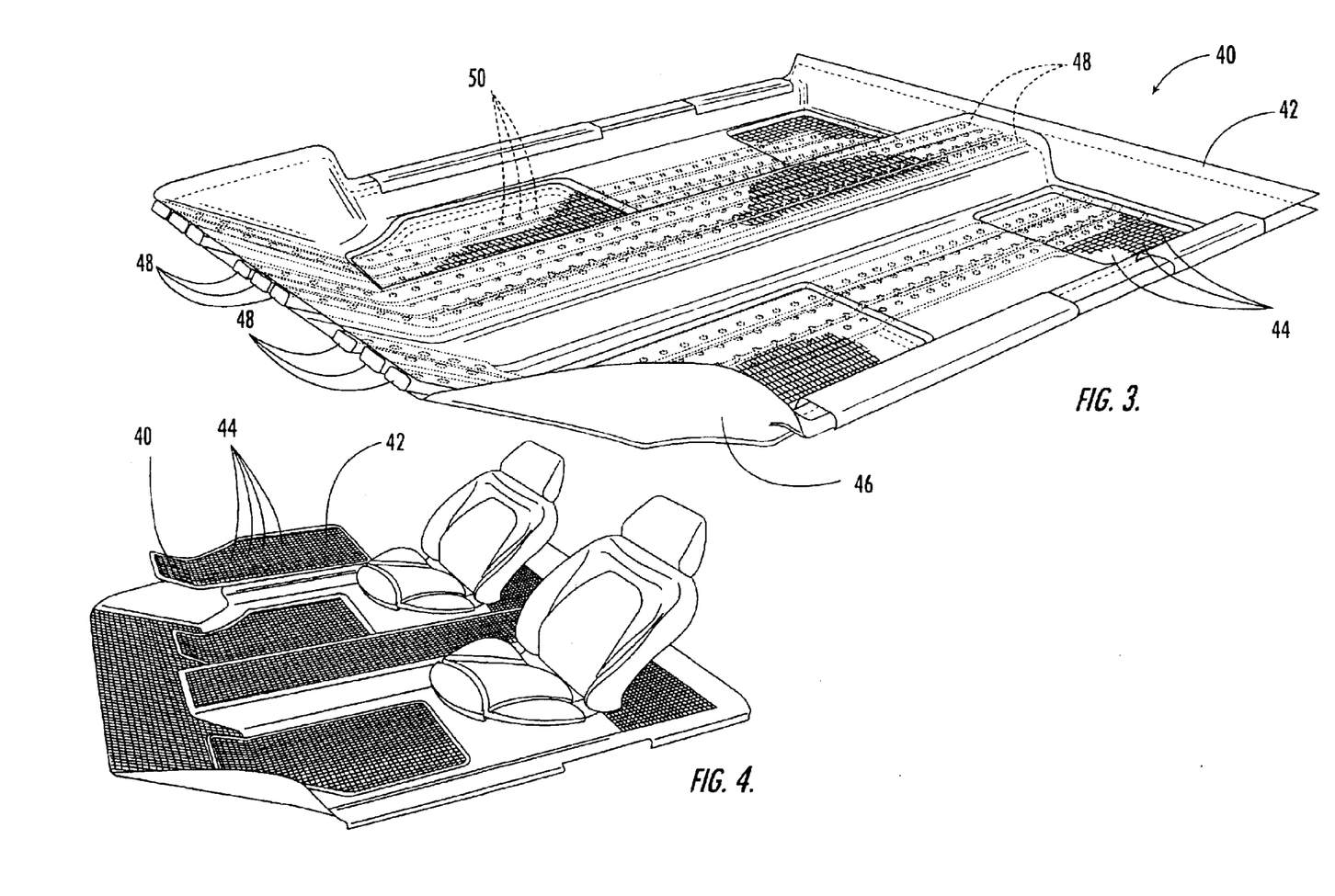
FIG. 3 is a perspective view of the floor covering of FIG. 2 illustrating the surface layer and base layer secured together in face-to-face contacting relationship.
FIG. 4 is a perspective view of a vehicle compartment having the floor covering of FIGS. 2–3 installed therewithin and illustrating the porous structure of the surface layer as a result of the plurality of apertures formed therein and through which air can flow from tubular air ducts disposed within the floor covering.

Referring now to FIGS. 2–4, a vehicle floor covering 40 according to embodiments of the present invention is illustrated. The floor covering 40 includes a surface layer 42 having a plurality of apertures 44 formed therethrough, a base layer 46 secured to the surface layer 42 in face-to-face contacting relationship, and a plurality of air ducts 48 sandwiched between the surface layer 42 and base layer 46. Each air duct 48 has a tubular configuration and includes a plurality of air outlets 50 spaced apart along the longitudinal extent thereof as illustrated. The air outlets 50 in the respective air ducts 48 are in fluid communication with apertures 44 in the surface layer 42 such that air flowing through each air duct 48 from an air source is distributed through apertures 44 in the surface layer 42 and into a vehicle compartment in which the vehicle floor covering 40 is installed.

The surface layer 42 includes opposite first and second surfaces 42a, 42b. The surface layer 42 of the floor covering 40 may be any type of carpet and may have a tufted, woven, knitted, or non-woven construction. For example, yarn piles may extend from the first surface to provide a wear-resistant and decorative surface within a vehicle compartment. In addition, the surface layer 42 may be a non-carpet material (e.g., natural and/or synthetic polymeric material, etc.). As illustrated in FIG. 4, the apertures 44 in the surface layer 42 cause the surface layer 42 to have a porous structure such that air flowing within the air ducts 48 can flow into a vehicle compartment through virtually any location in the floor covering 40. The porous structure of floor coverings, according to embodiments of the present invention, can have virtually any configuration. Moreover, apertures formed within the surface layer of floor coverings according to embodiments of the present invention, can have virtually any size and shape, and can be arranged in any pattern desired.

Although not illustrated, it is within the scope of the present invention to include dampers or other types of air flow controls within one or more of the air ducts 48 to control the flow rate, amount, and location of air flowing into a vehicle compartment through the surface layer 42. Dampers or other air flow controls may also be configured to open and close one or more air outlets in one or more air ducts 48.

The base layer 46 of the illustrated floor covering 40 of FIGS. 2–4 includes opposite first and second surfaces 46a, 46b. The base layer first surface 46a and the surface layer second surface 42b are configured to be secured together in face-to-face contacting relationship. The surface layer 42 and base layer 46 may be adhesively secured together or may be secured together in various other ways known to those of skill in the art.

The base layer 46 may be formed from any type of natural and/or synthetic material including, but not limited to foam (e.g., polyurethane foam, thermoplastic foam, etc.), massback, and other thermoformable fibrous materials including those derived from natural and synthetic fibers. Massback is a relatively dense material, normally impermeable to air and thermoformable. Massback can be formed from virtually any plastic or rubber material which contains a high-mass filler material. An exemplary massback includes ethylene-vinylacetate (EVA) copolymer, polyethylene, or polyvinylchloride (PVC), and a high-mass filler material, such as glass, calcium carbonate or barium sulfate, added to increase the mass. Other suitable materials for the substrate include thermoformable stiff thermoplastic materials such as polystyrene, polyphenyl sulfide and polycarbonate, fiber-reinforced thermoplastics and fiber-reinforced thermosets such as epoxies, phenolics and the like.

The illustrated floor covering 40 has a three-dimensional shape that is configured to correspond with a portion of a vehicle compartment within which the floor covering 40 is to be installed and such that the base layer second surface 46b attaches to a portion (e.g., a floor panel, etc.) of the vehicle compartment in contacting face-to-face relationship therewith. The surface layer 42 can have form retention characteristics such that it maintains a form imposed upon it. Alternatively, the surface layer 42 may have elastic memory such that it is unable to maintain an unassisted non-flat configuration. For substrate materials having elastic memory, the base layer 46 can serve the function of a binder such that the surface layer 42 can maintain a shape imposed upon it via molding and other operations.

Figure 5:
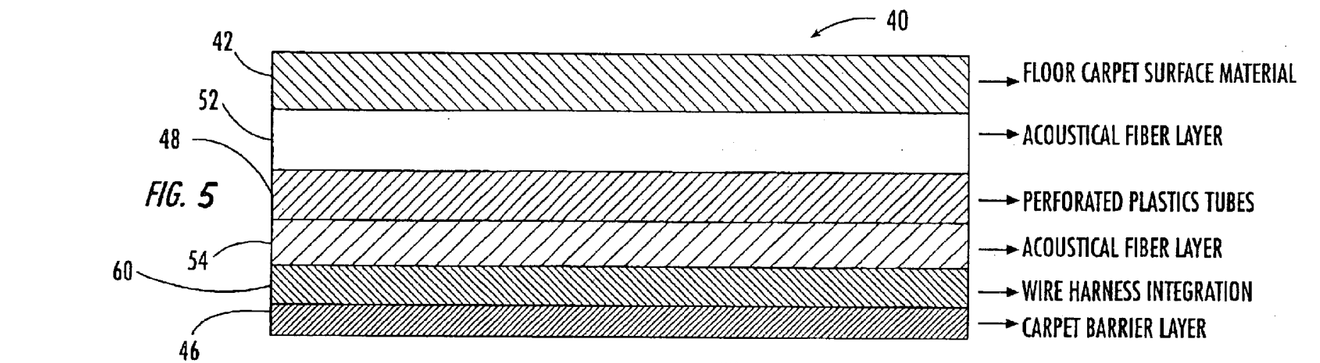
FIGS. 5 and 6A–6B are respective section views of a vehicle floor covering according to embodiments of the present invention.

According to embodiments of the present invention illustrated in FIG. 5, a layer of acoustic material 52 may be sandwiched between one or more of the tubular air ducts 48 and the surface layer 42 of the floor covering 40 of FIGS. 2–4. The acoustic layer may have a porous structure that facilitates fluid communication between the apertures in the surface layer and the tubular air duct air outlets. Alternatively, an acoustic layer 52 may be sandwiched between an air duct 48 and the surface layer 42 such that the acoustic layer 52 does not overlie one or more of the air outlets 50. According to embodiments of the present invention, a layer of acoustic material 54 may be sandwiched between one or more of the tubular air ducts 48 and the base layer 46, as illustrated in FIG. 5. The use of one or more acoustic layers 52, 54 can help attenuate noise caused by air flow through the one or more air ducts 48. In addition, the use of one or more acoustic layers 52, 54 can help attenuate noise emanating from sources within a vehicle compartment and/or from sources external to a vehicle compartment.

The utilization of air ducts within floor coverings in accordance with embodiments of the present invention can provide better flow and distribution of air (both heated air and cooled air) within vehicle interiors than conventional vehicle air systems. Moreover, embodiments of the present invention can eliminate the need for additional and costly air ducts and equipment that are provided beneath vehicle floor coverings and above vehicle headliners.

According to embodiments of the present invention, an electrical wiring harness configured to electrically interconnect vehicle electronic components may be sandwiched between the surface layer and base layer of a vehicle floor covering and/or within a single layer of material in a floor covering. In the illustrated embodiment of FIG. 5, an electrical wiring harness 60 is sandwiched between the acoustic layer 54 and the base layer 46.

Figure 6A:
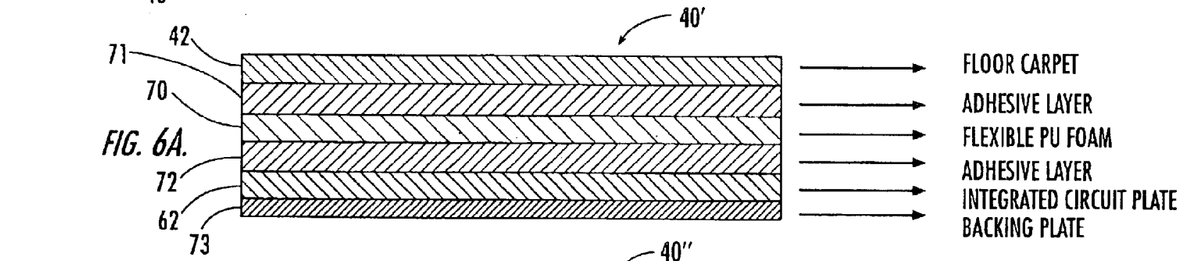
Figure 6B:
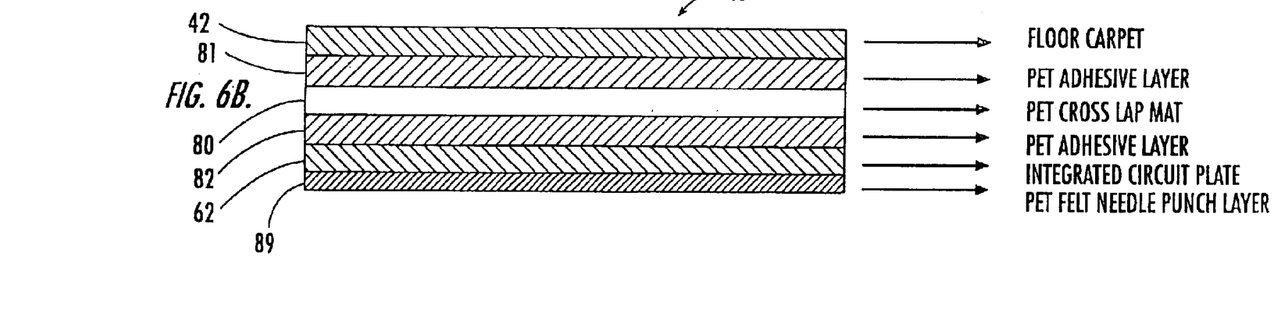

The term "electrical wiring harness" is intended to include any type of electrical wiring or component that can be disposed within a vehicle floor covering. For example, as illustrated in FIGS. 6A–6B, a flexible integrated circuit plate 62 is sandwiched between various layers of a vehicle floor covering. In the illustrated embodiment of FIG. 6A, a vehicle floor covering 40' includes a surface layer 42 adhesively secured to a flexible polyurethane foam layer 70 via an adhesive layer 71 (e.g., a web adhesive). The flexible polyurethane foam layer 70 is adhesively secured to the integrated circuit plate 62 via an adhesive layer 72 (e.g., a web adhesive). A backing plate 73 is attached to the integrated circuit plate 62 as illustrated.

In the illustrated embodiment of FIG. 6B, a vehicle floor covering 40" includes a surface layer 42 adhesively secured to a polyethylene terephthalate (PET) cross lap mat 80 via a PET adhesive layer 81 (e.g., a web adhesive). The PET cross lap mat 80 is adhesively secured to an integrated circuit plate 62 via a PET adhesive layer 82 (e.g., a web adhesive). A PET felt needle punch layer 84 is attached to the integrated circuit plate 62 as illustrated.

Figure 7:
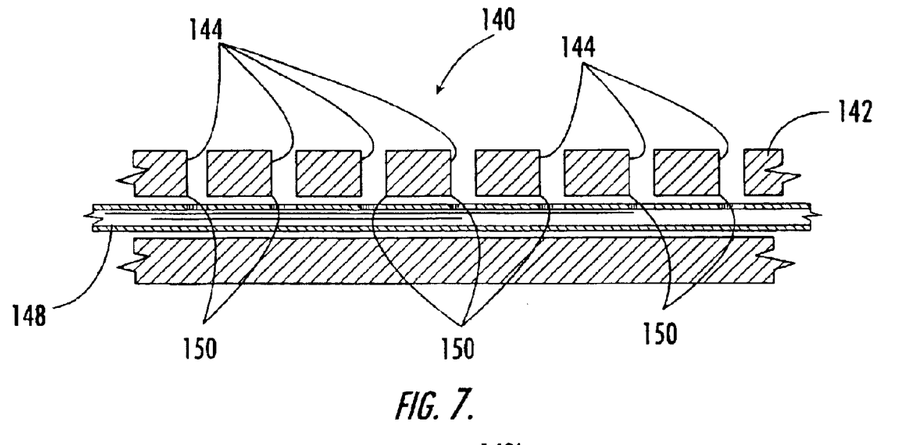
FIG. 7 is a section view of a vehicle floor covering, according to embodiments of the present invention, which includes a layer of material having a plurality of apertures formed therethrough, and one or more tubular air ducts disposed within the layer of material.

Referring to FIG. 7, a floor covering 140 for use within vehicles, according to embodiments of the present invention, includes a layer of material 142 having a plurality of apertures 144 formed therethrough, and one or more tubular air ducts 148 disposed within the layer of material 142. The tubular air duct 148 includes a plurality of air outlets 150 that are in fluid communication with apertures 144 in the layer of material such that air flowing through the air ducts from an air source is distributed through apertures in the layer of material and into a vehicle.

The layer of material 142 may be virtually any type of natural and/or synthetic material or blends thereof, and preferably a thermoformable thermoplastic polymeric material or blends of various thermoformable thermoplastic polymeric materials. Even more preferably, the layer of material 142 is a recyclable polymeric material or blends thereof. According to embodiments of the present invention, a layer of material 142 may have a substantially porous structure without apertures that align with the air outlets 150 of the air duct 148.

Figure 8:
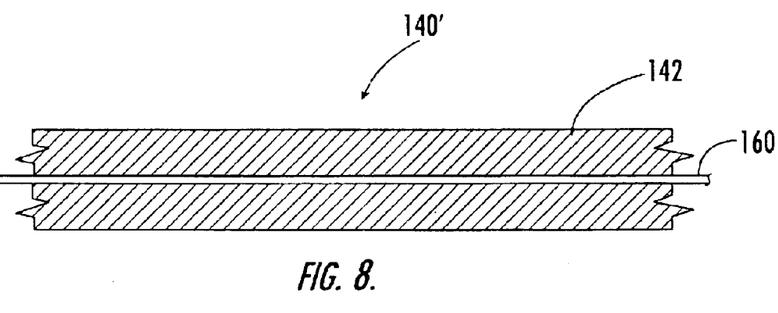
FIG. 8 is a section view of a vehicle floor covering, according to embodiments of the present invention, which includes a layer of material having an optical fiber disposed therewithin according to embodiments of the present invention.

Referring to FIG. 8, a floor covering 140' for use within a vehicle, according to embodiments of the present invention, includes one or more optical fibers 160 disposed within a layer of material 142, wherein the one or more optical fibers are configured to deliver light from a light source to one or more locations within a vehicle.

Figure 9:
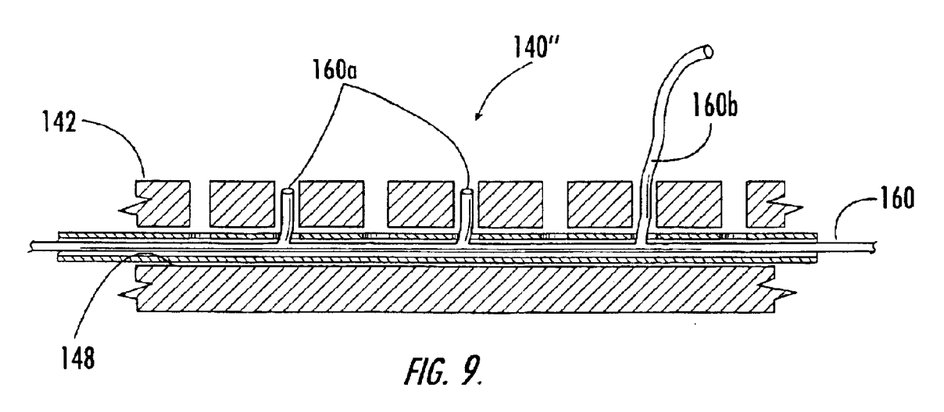
FIG. 9 illustrates optical fibers extending through an air duct of the floor covering of FIG. 7.

Referring to FIG. 9, a floor covering 140" for use within a vehicle, according to embodiments of the present invention, includes one or more optical fibers 160 extending through a tubular air duct 148 that is disposed within a layer of material 142 as described above with respect to FIG. 7. Because of their small cross-sectional size, a plurality of optical fibers may extend through an air duct without impeding or otherwise restricting the flow of air through the air duct.

In the illustrated embodiment of FIG. 9, optical fibers 160a extend into respective apertures 144 in the layer of material 142 to illuminate portions of the floor covering 140" adjacent the respective apertures 144. Also in the illustrated embodiment, optical fiber 160b extends through a respective aperture 144. Optical fiber 160b is configured to deliver light from a light source to one or more locations within a vehicle.

According to embodiments of the present invention, one or more optical fibers may be sandwiched between the surface layer 42 and base layer 46 of the vehicle floor covering 40 of FIGS. 2–4 to deliver light from a light source to one or more locations within a vehicle. Moreover, one or more optical fibers may extend through one or more of the air ducts 48.

Figure 10:
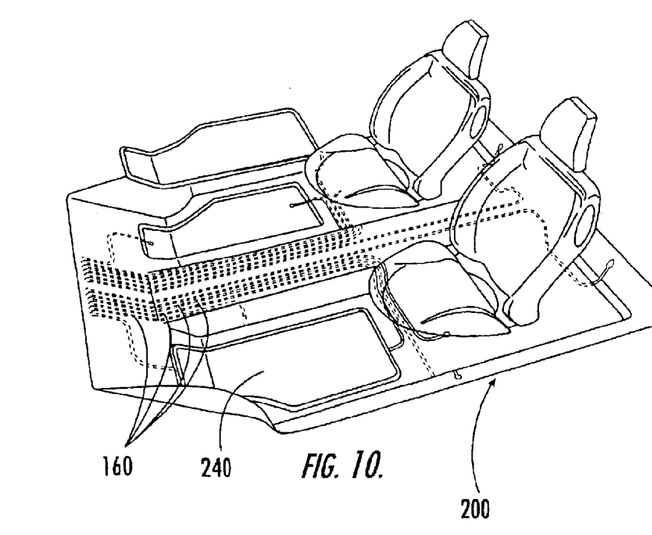
FIG. 10 is a perspective view of a portion of a vehicle compartment having a floor covering according to embodiments of the present invention disposed therewithin and illustrating optical fibers disposed therewithin and routed to various locations within the vehicle compartment.
Figure 11:
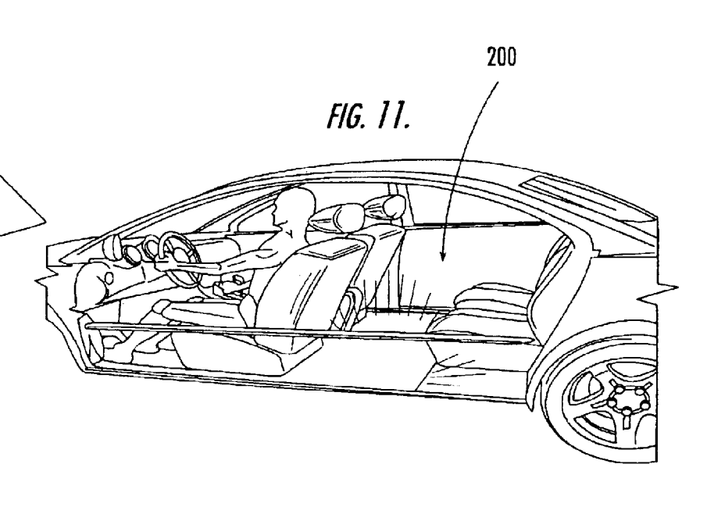
FIG. 11 illustrates the illumination of vehicle compartment floor via optical fibers disposed within floor coverings according to embodiments of the present invention.

Referring to FIG. 10, optical fibers 160 are illustrated disposed within a floor covering 240 and routed to various locations within a vehicle compartment 200 according to embodiments of the present invention. The illustrated floor covering 240 may be a carpet having a surface layer and a base layer as described above with respect to FIGS. 2–4, or the illustrated floor covering 240 may be a layer of polymeric material as described above with respect to FIGS. 7–9. FIG. 11 illustrates illumination of the floor area of the vehicle compartment 200 that can be obtained via optical fibers disposed within floor coverings according to embodiments of the present invention.

Figure 12:
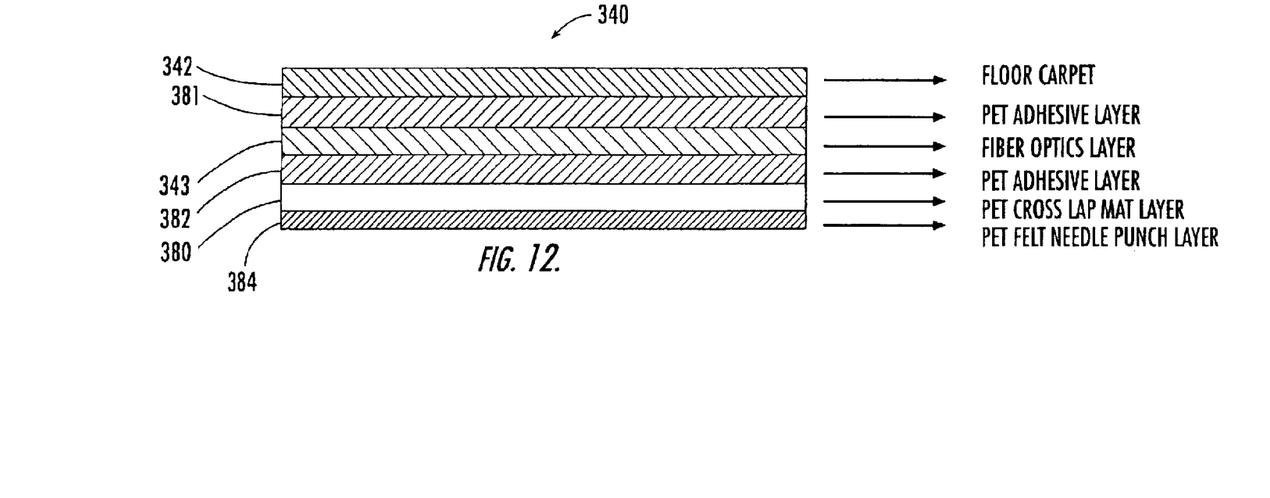
FIG. 12 is a section view of a vehicle floor covering according to embodiments of the present invention that includes a layer of fiber optics.

In the illustrated embodiment of FIG. 12, a vehicle floor covering 340 includes a surface layer 342 adhesively secured to a layer of optical fibers 343 (e.g., individual fibers, bundles of individual fibers, etc.) via a PET adhesive layer 381. The layer of optical fibers 343 is adhesively secured to a PET cross lap mat layer 380 via a PET adhesive layer 382. A PET felt needle punch layer 384 is attached to the PET cross lap mat layer 380 as illustrated.

The utilization of optical fibers within floor coverings in accordance with embodiments of the present invention allows the floor area of a vehicle to be better illuminated than conventional vehicle lighting systems. Moreover, optical fibers cab be routed to areas that conventional lighting systems cannot illuminate, such as under seats, beneath dashboards, in trunk compartment areas, etc., thereby increasing lighting effectiveness and enhancing vehicle occupant safety.

In addition, warning light signals can be provided to various locations of a vehicle via optical fibers disposed within floor coverings and other interior trim components, both within the vehicle and outside of the vehicle. Moreover, special lighting effects within vehicle interiors are obtainable via embodiments of the present invention. For example, optical fibers can deliver light having one or more colors and/or special effects to one or more vehicle locations. Customized lighting enhancements and highlighting within vehicle interiors is thereby facilitated by embodiments of the present invention, and the choices of which will be within the skill of one in he art.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A floor covering for use within a vehicle, comprising:
 a surface layer having a plurality of apertures formed therethrough;
 a base layer secured to the surface layer in face-to-face contacting relationship; and
 a tubular air duct sandwiched between the surface layer and base layer, wherein the tubular air duct comprises a plurality of air outlets that are in fluid communication with the apertures in the surface layer such that air flowing through the air duct from an air source is distributed through apertures in the surface layer and into a vehicle.

2. The floor covering of claim 1, further comprising a layer of acoustic material sandwiched between the tubular air duct and the surface layer, wherein the layer of acoustic material comprises a porous structure that facilitates fluid communication between apertures in the surface layer and the air duct outlets.

3. The floor covering of claim 1, further comprising a layer of acoustic material sandwiched between the tubular air duct and the base layer.

4. The floor covering of claim 1, further comprising an electrical wiring harness sandwiched between the surface layer and the base layer, wherein the electrical wiring harness is configured to electrically interconnect vehicle electronic components.

5. The floor covering of claim 1, further comprising one or more optical fibers sandwiched between the surface layer and the base layer, wherein the one or more optical fibers are configured to deliver light from a light source to one or more vehicle locations.

6. The floor covering of claim 5, wherein the one or more optical fibers are configured to deliver light from a light source to one or more vehicle locations via the apertures in the surface layer.

7. The floor covering of claim 5, wherein the one or more optical fibers are configured to illuminate the surface layer via the apertures in the surface layer.

8. The floor covering of claim 1, further comprising one or more optical fibers extending though the tubular air duct, wherein the one or more optical fibers are configured to deliver light from a light source to one or more vehicle locations.

9. A The floor covering of claim 1, further comprising a plurality of tubular air ducts sandwiched between the surface layer and the base layer, wherein each of the tubular air ducts comprises a respective plurality of air outlets that are in fluid communication with apertures in the surface layer such that air flowing through each air duct from an air source is distributed through apertures in the surface layer and into a vehicle.

10. The floor covering of claim 1, wherein the surface layer comprises carpeting having at least one of a tufted, woven, knitted, or non-woven construction.

11. A vehicle, comprising:
 an air source;
 a vehicle compartment including a floor; and
 a floor covering configured to be attached to the compartment floor, the floor covering comprising:
  a surface layer having a plurality of apertures formed therethrough;
  a base layer secured to the surface layer in face-to-face contacting relationship; and
  a tubular air duct sandwiched between the surface layer and base layer, wherein the air duct is in fluid communication with the air source, and wherein the air duct comprises a plurality of air outlets that are in fluid communication with apertures in the surface layer such that air flowing through the air duct from the air source is distributed through apertures in the surface layer and into the vehicle.

12. The vehicle of claim 11, further comprising a layer of acoustic material layer sandwiched between the tubular air duct and the surface layer, wherein the layer of acoustic material comprises a porous structure that facilitates fluid communication between apertures in the surface layer and the air duct outlets.

13. The vehicle of claim 11, further comprising a layer of acoustic material layer sandwiched between the tubular air duct and the base layer.

14. The vehicle of claim 11, further comprising an electrical wiring harness sandwiched between the surface layer and the base layer, wherein the electrical wiring harness is configured to electrically interconnect electronic components of the vehicle.

15. The vehicle of claim 11, further comprising:
 a light source; and
 one or more optical fibers sandwiched between the surface layer and the base layer, wherein the one or more optical fibers are configured to deliver light from the light source to one or more vehicle locations.

16. The vehicle of claim 15, wherein the one or more optical fibers extend though the tubular air duct.

17. The vehicle of claim 15, wherein the one or more optical fibers are configured to deliver light from the light source to vehicle locations via the apertures in the surface layer.

18. The vehicle of claim 15, wherein the one or more optical fibers are configured to illuminate the surface layer via the apertures in the surface layer.

19. The vehicle of claim 15, wherein the light source is configured to generate a warning light signal, and wherein the one or more optical fibers are configured to deliver the warning light signal to one or more vehicle locations.

20. The vehicle of claim 15, wherein the light source is configured to generate light having one or more colors, and wherein the one or more optical fibers are configured to deliver the light having one or more colors to one or more vehicle locations.

21. The vehicle of claim 15, wherein the light source is configured to generate light having one or more special effects, and wherein the one or more optical fibers are configured to deliver the light having one or more special effects to one or more vehicle locations.

22. The vehicle of claim 11, further comprising a plurality of tubular air ducts sandwiched between the surface layer and the base layer, wherein each of the tubular air ducts comprises a respective plurality of air outlets that are in fluid communication with apertures in the surface layer such that air flowing through each air duct from an air source is distributed through apertures in the surface layer and into the vehicle.

23. The vehicle of claim 11, wherein the surface layer comprises carpeting having at least one of a tufted, woven, knitted, or non-woven construction.

24. A floor covering for use within a vehicle, comprising:
 a layer of material having a plurality of apertures formed therethrough; and
 a tubular air duct disposed within the layer of material, wherein the tubular air duct comprises a plurality of air outlets that are in fluid communication with apertures in the layer of material such that air flowing through the air duct from an air source is distributed through apertures in the layer of material and into a vehicle.

25. The floor covering of claim 24, further comprising an electrical wiring harness disposed within the layer of material, wherein the electrical wiring harness is configured to electrically interconnect electronic components of a vehicle.

26. The floor covering of claim 24, further comprising one or more optical fibers disposed within the layer of material, wherein the one or more optical fibers are configured to deliver light from a light source to one or more vehicle locations.

27. The floor covering of claim 26, wherein the one or more optical fibers extend though the tubular air duct.

28. The floor covering of claim 26, wherein the one or more optical fibers are configured to deliver light from a light source to one or more vehicle locations via the apertures in the layer of material.

29. The floor covering of claim 26, wherein the one or more optical fibers are configured to illuminate the layer of material via the apertures in the layer of material.

30. The floor covering of claim 24, further comprising a plurality of tubular air ducts disposed within the layer of material, wherein each of the tubular air ducts comprises a respective plurality of air outlets that are in fluid communication with the apertures in the layer of material such that air flowing through the air ducts from an air source is distributed through apertures in the layer of material and into a vehicle.

31. A vehicle, comprising:
   an air source;
   a vehicle compartment including a floor; and
   a floor covering configured to be attached to the compartment floor, comprising:
      a layer of material having a plurality of apertures formed therethrough; and
      a tubular air duct disposed within the layer of material, wherein the tubular air duct comprises a plurality of air outlets that are in fluid communication with the apertures in the surface layer such that air flowing through the air duct from an air source is distributed through apertures in the layer of material and into the vehicle.

32. The vehicle of claim 31, further comprising an electrical wiring harness disposed within the layer of material, wherein the electrical wiring harness is configured to electrically interconnect electronic components of the vehicle.

33. The vehicle of claim 31, further comprising:
   a light source; and
   one or more optical fibers disposed within the layer of material, wherein the one or more optical fibers are configured to deliver light from the light source to one or more vehicle locations.

34. The vehicle of claim 33, wherein the one or more optical fibers are configured to deliver light from a light source to one or more vehicle locations via the apertures in the layer of material.

35. The vehicle of claim 33, wherein the one or more optical fibers are configured to illuminate the layer of material via the apertures in the layer of material.

36. The vehicle of claim 33, wherein the light source is configured to generate a warning light signal, and wherein the one or more optical fibers are configured to deliver the warning light signal to one or more vehicle locations.

37. The vehicle of claim 33, wherein the light source is configured to generate light having one or more colors, and wherein the one or more optical fibers are configured to deliver the light having one or more colors to one or more vehicle locations.

38. The vehicle of claim 33, wherein the light source is configured to generate light having one or more special effects, and wherein the one or more optical fibers are configured to deliver the light having one or more special effects to one or more vehicle locations.

39. The vehicle of claim 33, wherein the one or more optical fibers extend though the tubular air duct.

40. The vehicle of claim 31, further comprising a plurality of tubular air ducts disposed within the layer of material, wherein each of the tubular air ducts comprises a respective plurality of air outlets that are in fluid communication with apertures in the layer of material such that air flowing through each air duct from the air source is distributed through apertures in the layer of material and into the vehicle.

41. A floor covering for use within a vehicle, comprising:
   a surface layer having a plurality of apertures formed therethrough;
   a base layer secured to the surface layer in face-to-face contacting relationship;
   one or more optical fibers sandwiched between the surface layer and the base layer, wherein the one or more optical fibers are configured to deliver light from a light source to one or more vehicle locations; and
   an electrical wiring harness sandwiched between the surface layer and the base layer, wherein the electrical wiring harness is configured to electrically interconnect vehicle electronic components.

42. The floor covering of claim 41, wherein the one or more optical fibers are configured to deliver light from a light source to one or more vehicle locations via the apertures in the surface layer.

43. The floor covering of claim 41, wherein the one or more optical fibers are configured to illuminate the surface layer via the apertures in the surface layer.

44. The floor covering of claim 41, wherein the surface layer comprises carpeting having at least one of a tufted, woven, knitted, or non-woven construction.

45. A vehicle, comprising:
   a light source;
   a vehicle compartment including a floor; and
   a floor covering configured to be attached to the compartment floor, the floor covering comprising:
      a surface layer having a plurality of apertures formed therethrough;
      a base layer secured to the surface layer in face-to-face contacting relationship;
      one or more optical fibers sandwiched between the surface layer and the base layer, wherein the one or more optical fibers are configured to deliver light from the light source to one or more vehicle locations; and
      an electrical wiring harness sandwiched between the surface layer and the base layer, wherein the electrical wiring harness is configured to electrically interconnect electronic components of the vehicle.

46. The vehicle of claim 45, wherein the one or more optical fibers are configured to deliver light from the light source to vehicle locations via the apertures in the surface layer.

47. The vehicle of claim 45, wherein the one or more optical fibers are configured to illuminate the surface layer via the apertures in the surface layer.

48. The vehicle of claim 45, wherein the light source is configured to generate a warning light signal, and wherein the one or more optical fibers are configured to deliver the warning light signal to one or more vehicle locations.

49. The vehicle of claim 45, wherein the light source is configured to generate light having one or more colors, and wherein the one or more optical fibers are configured to deliver the light having one or more colors to one or more vehicle locations.

50. The vehicle of claim 45, wherein the light source is configured to generate light having one or more special effects, and wherein the one or more optical fibers are configured to deliver the light having one or more special effects to one or more vehicle locations.

51. The vehicle of claim 45, wherein the surface layer comprises carpeting having at least one of a tufted, woven, knitted, or non-woven construction.

52. A floor covering for use within a vehicle, comprising:
   a layer of material having a plurality of apertures formed therethrough;
   one or more optical fibers disposed within the layer of material, wherein the one or more optical fibers are configured to deliver light from a light source to one or more vehicle locations; and
   an electrical wiring harness disposed within the layer of material, wherein the electrical wiring harness is configured to electrically interconnect electronic components of a vehicle.

53. The floor covering of claim 52, wherein the one or more optical fibers are configured to deliver light from a light source to one or more vehicle locations via the apertures in the layer of material.

54. The floor covering of claim 52, wherein the one or more optical fibers are configured to illuminate the layer of material via the apertures in the layer of material.

55. A vehicle, comprising:
   a light source;
   a vehicle compartment including a floor; and
   a floor covering configured to be attached to the compartment floor, comprising:
      a layer of material having a plurality of apertures formed therethrough;
      one or more optical fibers disposed within the layer of material, wherein the one or more optical fibers are configured to deliver light from the light source to one or more vehicle locations; and
      an electrical wiring harness disposed within the layer of material, wherein the electrical wiring harness is configured to electrically interconnect electronic components of the vehicle.

56. The vehicle of claim 55, wherein the one or more optical fibers are configured to deliver light from a light source to one or more vehicle locations via the apertures in the layer of material.

57. The vehicle of claim 55, wherein the one or more optical fibers are configured to illuminate the layer of material via the apertures in the layer of material.

58. The vehicle of claim 55, wherein the light source is configured to generate a warning light signal, and wherein the one or more optical fibers are configured to deliver the warning light signal to one or more vehicle locations.

59. The vehicle of claim 55, wherein the light source is configured to generate light having one or more colors, and wherein the one or more optical fibers are configured to deliver the light having one or more colors to one or more vehicle locations.

60. The vehicle of claim 55, wherein the light source is configured to generate light having one or more special effects, and wherein the one or more optical fibers are configured to deliver the light having one or more special effects to one or more vehicle locations.

* * * * *

UNITED STATES PATENT AND TRADEMARK OFFICE
CERTIFICATE OF CORRECTION

PATENT NO. : 6,736,442 B2
DATED : May 18, 2004
INVENTOR(S) : Gebreselassie et al.

It is certified that error appears in the above-identified patent and that said Letters Patent is hereby corrected as shown below:

Title page,
Item [73], Assignee, should read -- Collins & Aikman Products Co., Troy, MI (US) --
Item [56], References Cited, U.S. PATENT DOCUMENTS, references five and seven should read
-- 3,908,900 A     09/1975     Smith        237/12.3A
   4,234,907 A     11/1980     Daniel       362/556 --

Column 8,
Line 42, should read -- the skill of one in the art. --

Signed and Sealed this

Thirtieth Day of November, 2004

JON W. DUDAS
*Director of the United States Patent and Trademark Office*